(12) United States Patent
Stoleru et al.

(10) Patent No.: US 12,283,758 B2
(45) Date of Patent: Apr. 22, 2025

(54) SYSTEM AND METHODS FOR USE WITH ELECTRONICALLY STEERABLE ANTENNAS FOR WIRELESS COMMUNICATIONS

(71) Applicant: Gilat Satellite Networks Ltd., Petah Tikva (IL)

(72) Inventors: Ronen Stoleru, Tel-Aviv (IL); Vesselin Peshlov, Sofia (BG)

(73) Assignee: Gilat Satellite Networks Ltd., Petah Tikva (IL)

( * ) Notice: Subject to any disclaimer, the term of this patent is extended or adjusted under 35 U.S.C. 154(b) by 178 days.

(21) Appl. No.: 17/157,179

(22) Filed: Jan. 25, 2021

(65) Prior Publication Data
US 2021/0234270 A1 Jul. 29, 2021

Related U.S. Application Data

(60) Provisional application No. 62/968,471, filed on Jan. 31, 2020, provisional application No. 62/965,358, filed on Jan. 24, 2020.

(51) Int. Cl.
  *H01Q 3/36* (2006.01)
  *H01Q 3/28* (2006.01)
  *H04W 16/28* (2009.01)

(52) U.S. Cl.
  CPC .......... *H01Q 3/36* (2013.01); *H01Q 3/28* (2013.01); *H04W 16/28* (2013.01)

(58) Field of Classification Search
  CPC ............ H01Q 3/24; H01Q 3/34; H01Q 3/242; H01Q 21/22

USPC .......................... 343/837, 713; 342/368, 372
See application file for complete search history.

(56) References Cited

U.S. PATENT DOCUMENTS

| | | | | |
|---|---|---|---|---|
| 3,816,830 A * | 6/1974 | Giannini | ............... | D06M 15/31 |
| | | | | 342/359 |
| 4,532,519 A * | 7/1985 | Rudish | ............... | H01Q 25/00 |
| | | | | 342/368 |
| 5,243,358 A * | 9/1993 | Sanford | ............... | H01Q 19/005 |
| | | | | 343/836 |
| 5,410,321 A * | 4/1995 | Gordon | ............... | H01Q 3/24 |
| | | | | 342/374 |
| 5,767,807 A * | 6/1998 | Pritchett | ............... | H01Q 3/24 |
| | | | | 343/834 |
| 6,175,723 B1 * | 1/2001 | Rothwell, III | ............... | H01Q 3/24 |
| | | | | 343/810 |
| 6,400,335 B1 * | 6/2002 | Weaver | ............... | H01Q 3/24 |
| | | | | 342/372 |
| 7,187,325 B2 * | 3/2007 | Subotic | ............... | H01Q 21/205 |
| | | | | 342/368 |
| 7,545,324 B2 * | 6/2009 | Kalian | ............... | H01Q 25/02 |
| | | | | 342/372 |
| 7,570,209 B2 * | 8/2009 | Shi | ............... | H01Q 3/267 |
| | | | | 342/372 |

(Continued)

*Primary Examiner* — Bo Fan
(74) *Attorney, Agent, or Firm* — Banner & Witcoff, Ltd.

(57) ABSTRACT

Examples disclosed herein describe an antenna with antenna elements that may be selectively activated and deactivated to define active apertures. The active apertures may be of different shapes and sizes. An antenna may include one active aperture or multiple active apertures at a point in time. These one or more active apertures may be reconfigured, e.g., by deactivating the active antenna elements and activating other antenna elements.

22 Claims, 11 Drawing Sheets

(56) References Cited

U.S. PATENT DOCUMENTS

| | | | |
|---|---|---|---|
| 7,728,769 B2* | 6/2010 | Chang | G01S 7/414 342/372 |
| 8,279,132 B2* | 10/2012 | Jung | H01Q 21/065 343/876 |
| 9,568,590 B1* | 2/2017 | Haupt | G01S 7/2813 |
| 9,917,363 B1* | 3/2018 | Gauba | H01Q 21/24 |
| 10,243,276 B2* | 3/2019 | Ford | H01Q 3/005 |
| 10,320,471 B1* | 6/2019 | Panthi | H04B 7/18513 |
| 10,566,683 B1* | 2/2020 | Campbell | H01Q 3/36 |
| 10,622,698 B2* | 4/2020 | Richards | H01Q 1/1257 |
| 10,910,709 B1* | 2/2021 | Hill | H01Q 3/385 |
| 2002/0036586 A1* | 3/2002 | Gothard | H01Q 19/32 342/374 |
| 2003/0162566 A1* | 8/2003 | Shapira | H01Q 1/246 455/562.1 |
| 2004/0108963 A1* | 6/2004 | Clymer | H01Q 21/0037 343/837 |
| 2005/0024286 A1* | 2/2005 | Fukuda | H01Q 21/061 343/820 |
| 2005/0285784 A1* | 12/2005 | Chiang | H04B 7/0808 342/359 |
| 2008/0018545 A1* | 1/2008 | Kaplan | H01Q 1/3275 343/713 |
| 2008/0218424 A1* | 9/2008 | Blanton | H01Q 21/061 342/359 |
| 2009/0251369 A1* | 10/2009 | Cock | G01S 13/4463 342/372 |
| 2011/0026624 A1* | 2/2011 | Gummalla | H01Q 1/243 342/374 |
| 2012/0189078 A1* | 7/2012 | Eom | H01Q 1/246 375/295 |
| 2013/0243054 A1* | 9/2013 | Adada | H04B 17/102 375/222 |
| 2016/0139271 A1* | 5/2016 | Chamseddine | G01S 19/13 342/357.51 |
| 2017/0331176 A1* | 11/2017 | Levy | H01Q 1/38 |
| 2017/0358851 A1* | 12/2017 | Diamond | H01Q 3/24 |
| 2018/0006371 A1* | 1/2018 | Dang | H04W 16/28 |
| 2018/0145744 A1* | 5/2018 | Petranovich | H04B 7/18515 |
| 2018/0301803 A1* | 10/2018 | Savage | H01Q 19/06 |
| 2018/0337722 A1* | 11/2018 | Paulsen | H01Q 1/288 |

* cited by examiner

SYSTEM AND METHODS FOR USE WITH ELECTRONICALLY STEERABLE ANTENNAS FOR WIRELESS COMMUNICATIONS

CROSS-REFERENCE TO RELATED APPLICATIONS

This application claims priority to U.S. Provisional Application No. 62/965,358, entitled "Electrically Steerable Antennas for Wireless Communications," filed Jan. 24, 2020 and to U.S. Provisional Application No. 62/968,471, entitled "System and Method for Use with Electronically Steerable Antennas for Wireless Communications," filed Jan. 31, 2020. Each of these applications is incorporated herein by reference in its entirety.

TECHNICAL FIELD

Aspects of the disclosure pertain to antennas for wireless communications. Some aspects pertain to electronically steerable array (ESA) antennas for wireless communications.

BACKGROUND

Wireless communication systems, including systems for communication via satellites, are being used for a variety of civil and military applications, including aviation, maritime, and land-mobility. Antennas may be used to transmit and receive wireless signals between various distant devices. In some cases, the antennas being used may consume a high amount of power, may have a high amount of scan loss, and may produce errant radiation.

BRIEF SUMMARY

The following presents a simplified summary in order to provide basic understanding of some aspects of the disclosure. This summary is not an extensive overview of the disclosure, it is neither intended to identify key or critical elements of the disclosure nor to delineate the scope of the disclosure. This summary merely presents some aspects of the disclosure in a simplified form as a prelude to the description below.

It has been found that the planar phased array antennas may be susceptible to "scan loss," which may account for a drop in antenna directivity versus scanning angle measured from the normal to antenna plane (boresight direction) to a beam direction. For example, in the case of beam scan of 45 degrees, the directivity of the antenna array with respect to the boresight direction may drop by more than 2 dB, while for a beam scan of 60 degrees, the directivity with respect to the boresight direction can drop by more than 4 dB.

It has also been found that phased array antennas may be susceptible to a broadening of antenna beam-width at large scan angles, which, in a receiving (Rx) mode of operation, may lead to adjacent satellite interferences (ASI) (e.g., from neighboring satellites at geostationary orbits). In a transmitting (Tx) mode of operation, the phased array antennas may be susceptible to generating interferences to adjacent satellites and therefore exceed government regulations for equivalent isotropically radiated power (EIRP) Spectral Density (ESD). For example, when an antenna mounted on a moving platform, e.g., an aircraft, communicates with geostationary earth orbit (GEO) satellites at low elevation angles (which may be associated with large angle beam scanning), the aircraft flight path and aircraft maneuvers may cause the beam to skew to some extent that may introduce interference to adjacent satellites. It has also been found that antennas used on aircraft platforms are typically smaller and have radiation patterns that may have variable symmetry and/or variable geographic skew angles toward the satellite. Radiating patterns of these antennas may not comply with the government regulations, such as European Telecommunications Standards Institute (ETSI) and/or U.S. Federal Communications Commission (FCC) off-axis and/or on-axis EIRP Spectral Density regulations.

It has also been found that a) antenna with a narrow beam-width may better focus the radiated or received electromagnetic energy in a particular direction, b) the beam-width of an antenna may be related to antenna aperture dimension, e.g., the larger the antenna the narrower its beam-width, c) an antenna may have symmetrical and non-symmetrical beam width. For example, planar antennas with circular symmetry may have similar and/or substantially the same symmetrical beam width in all directions at boresight. Antennas with rectangular shape may have narrow beam width along the long axis of aperture and may have a wide beam-width along the short axis of the aperture, as observed at boresight. To compensate for the scan losses and to narrow the beam width, examples herein describe antennas with a plurality (e.g., hundreds and/or thousands) of antenna elements capable of maintaining individual interference levels. Some antenna configurations may increase the power consumption of antenna from a relatively small level (a few watts and/or a few hundred watts) to a relatively larger amount in the range of kilowatts, which may have to be mitigated.

One aspect of the disclosure is related to power optimized elements management (POEM) antenna which may comprise a plurality of antenna elements. In some examples, each antenna element may be connected to one or more receive and/or transmit devices. In other examples groups of antenna elements may be connected to one or more transmit and/or receive devices. In another example each antenna element or group of antenna elements may be connected to one or more transceiver devices. Each device connected to an antenna element or group of antenna elements may be activated and deactivated separately to generate a configurable active aperture. In one example, all antenna elements of the active aperture may be activated and work in Tx mode when transmitting communication signals, and/or in Rx mode when receiving communication signals. In another example, part of the activated antenna elements may work in Tx mode and another part of activated antenna elements may work in Rx mode. In still further examples, some antenna elements of the active aperture may be activated and selectively operate in transmit mode communicating with one or more devices (e.g., satellites) when transmitting communication signals, and/or some of the antenna elements of the active aperture may be activated and selectively operate in a receive mode when receiving communication signals from one or more devices (e.g., satellites).

In an example, an antenna may comprise a plurality of antenna elements configured to receive or transmit electromagnetic radiation; and one or more processors configured to electronically activate a subset of the plurality of antenna elements forming an active aperture of the antenna.

In another example, a method may comprise monitoring, by a processor, one or more parameters associated with an antenna comprising a plurality of antenna elements; and electronically activating, based on the one or more parameters, a subset of the plurality of antenna elements forming an active aperture of the antenna.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Wireless communications utilize antennas to transmit and receive signals between different devices. For example, a satellite communication system for commercial, non-commercial, and/or business applications (e.g., aviation) may comprise antennas mounted on a remote station such as a fixed or mobile device (e.g., an aircraft), a satellite, and/or a ground earth station (GES) (e.g., a Hub station). The antennas may provide for reception and transmission of the electromagnetic signals communicated between, for example, the remote station(s) and/or other remote station(s) and/or Hub station(s). A variety of remote antenna types may be used including, but not limited to: steered flat panel antennas (e.g., mechanically steerable passive arrays and/or electronically steerable active arrays), reflectors and/or reflector arrays, hybrid steering antennas (combining mechanical steering with electronic steering), and electronic steerable antennas such as phased array antennas (PAA) which may include electronic beam steering capabilities.

In some examples, mobile antennas may be arranged to be mounted on moving platforms such as aircraft (e.g., aero antennas) and may be variously configured. In some examples, these antennas may have a low profile to reduce air drag and fuel consumption, may optimize transmit and receive performance per given footprint dimension, may be disposed at a location such as on the top of vehicle, train, boat, high altitude platforms (HAPS) satellite, and/or aircraft's fuselage, may be optimized to reduce operation and maintenance costs, may be configured to consume a low amount of power, may be configured to dissipate power when the vehicle is not moving (without air circulation around the antenna array), and may support wide frequency bands, wide angle scanning performance, multi-beam operation, and fast beam steering.

In some examples, the antenna may be used as a part of the ground-based antenna system that is a part of a satellite communication system (e.g., mobile devices with satellite communication features). The satellites of the satellite communication system may be in one or more constellations different orbits such as low Earth orbit (LEO), medium Earth Orbit (MEO), or geostationary earth orbit (GEO). For example, a LEO satellite constellation (e.g., a mega-constellation) may be composed of a plurality of (e.g., thousands) of satellites, based on architectures such as CubeSat architecture. The satellite constellation may be in communication with a number of ground stations. The space segment of the constellation may be organized in several orbital planes that may be deployed at different inclinations and altitudes. The satellites may move at high speeds (e.g., higher than 25,000 km/h) relative to the ground stations. Therefore, a communication link between a ground station and a satellite may be available for a short time (e.g., a few minutes) before handover to another satellite occurs.

In another example, the antenna may be used as a payload for HAPS, LEO, and/or MEO satellites and may provide a relatively more power efficient beam scanning antenna solution with a relatively lower profile.

A phased array antenna includes as an example an antenna that may be utilized as a mobile antenna. A phased array antenna may comprise multiple electronically-controlled antenna elements (e.g., fixed and/or variable beam antenna elements), which in combination may control the antenna's radiation and/or reception pattern. The phased array antenna's radiated beam and/or received beam may be electronically steered relative to a plane of the antenna array. Phase shifters or time-delay components may be connected to individual transmitting and/or receiving antenna elements (e.g., sub-arrays of antenna elements) to enable scanning of the beam in different directions. Individually controlling the amplitude and phase of each antenna element in a phased array antenna, in conjunction with beamforming techniques, may allow suppression of side lobes and may further allow creating radiations pattern nulls in certain directions and/or application specific patterns.

Control circuitry may be variously configured to include such items as compact silicon technology based integrated circuits, one or more processors, controllers, PGA, ASICs, and/or custom controllers and may be configured to include transmitters, receivers, modems, encoders, decoders, phase shifter(s) to adjust phase, beam steering circuits, polarization circuits, attenuators, filters, amplifiers (e.g., low noise amplifier(s)), and beam forming and polarization circuits, as well as other control and/or communication circuits for implementing transmit-only, receive-only, and/or transmit/receive components of a mobile communication system such as a mobile satellite terminal system. Technologies like SiGe BiCMOS, CMOS SOI (silicon-on-insulator) may allow combination of digital circuitry to control the steering in the array and a radio frequency (RF) signal path to achieve the phase and amplitude adjustment.

Phased array antennas may comprise a single array for transmit-only, a single array for receive-only and/or as single array for transmit/receive. In addition, phased array antennas may comprise of a combination of array building blocks, often referred to as tiles, which may be combined in a group to form a larger array aperture.

Examples disclosed herein describe an adaptive beam forming method of power optimized elements management (POEM) antenna, which may allow reasonable antenna power consumption and may mitigate the adjacent satellite interference (ASI) and EIRP spectral density (ESD) challenges.

According to an aspect of the disclosure, power optimized elements management (POEM) antenna that may comprise a plurality of antenna elements that may be activated and deactivated (e.g., statically or dynamically) for reconfiguration of active antenna aperture (tile or a group of tiles) is presented. According to another aspect of the disclosure method of activation and deactivation of antenna elements or groups of antenna elements for reconfiguration of antenna active aperture is presented.

Yet another aspect of disclosure is directed to method of activation and deactivation of antenna elements. Method of activation and deactivation of antenna elements and group of antenna elements may reconfigure the active area of the antenna array. In one example the reconfiguration of an active antenna area may change the three-dimensional antenna pattern, maximizing the transmit energy in one or more directions and minimizing the energy in other directions. In another example, the reconfiguration of an active antenna area may change the way the antenna receives the energy, amplifying the energy received in one or more directions while minimizing the energy received from other directions. In yet another example, the reconfiguration of an active antenna area may change the beam width of the antenna in a set of directions to make it narrower in directions where the regulatory limits (e.g., ETSI standards or FCC blanket licensing provisions) are exceeded. In some examples, POEM antennas may operate in the microwave frequency bands, for example Ku-bands: 10.7 GHZ-14.5 GHZ and K/Ka-bands: 17.7 GHZ-31 GHz. At these frequency bands, the antenna elements may be activated and/or deactivated individually and/or in a group and may be as small as, for example, several millimeters in diameter (e.g., 2-6 mm, 3-5 mm, and/or 4 mm diameter single antenna element) to allow for aperture shape control with a selected resolution.

Figure 1:
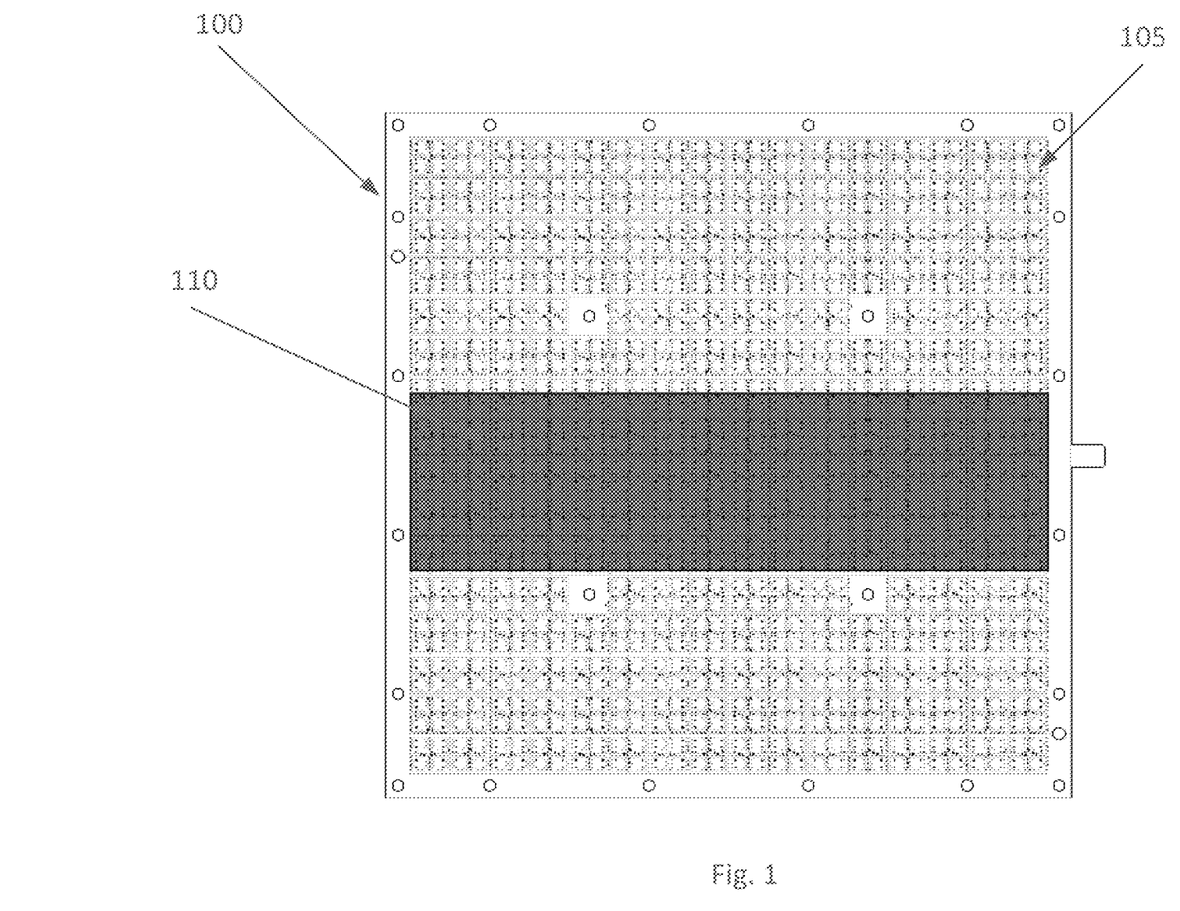
FIG. 1 shows an example of electronically reconfigurable aperture phased array antenna with active elements area, in accordance with aspects of the disclosure.

FIG. 1 shows an example antenna array (tile or a group of tiles) 100 with active area (or aperture) 110. The antenna array 100 may comprise a plurality of antenna elements 105. As shown, the antenna elements 105 may have been activated in area 110 and/or deactivated outside of area 110. In some examples, each antenna element 105 may be connected to one or more devices which may include one or more phase shifters for adjusting the phase of each antenna element 105 (e.g., for beam steering and polarization processing) and one or more attenuators (e.g., for tapering the beam and polarization setup). In some examples, active elements 105 may operate in: (a) transmit mode when transmitting communication signals, (b) receive mode when receiving communication signals, and/or (c) both transmit and receive modes. In another example, a first part of the activated antenna elements 105 may operate in transmit mode and a second part of activated antenna elements 105 may operate in receive mode. In some examples, all active antenna elements 105 may work in both transmit and receive modes. It is to be understood that the aforementioned operations (e.g., transmit and/or receive) of the active elements 105 are merely for illustrations, and any proportion of the active elements 105 may operate in a transmit mode, a receive mode, or both modes.

In some examples, different forms (e.g., geometries) of active antenna elements 105 may be configured to define active antenna aperture. For example, FIG. 1 shows active aperture 110 in a rectangular form.

Figure 2:
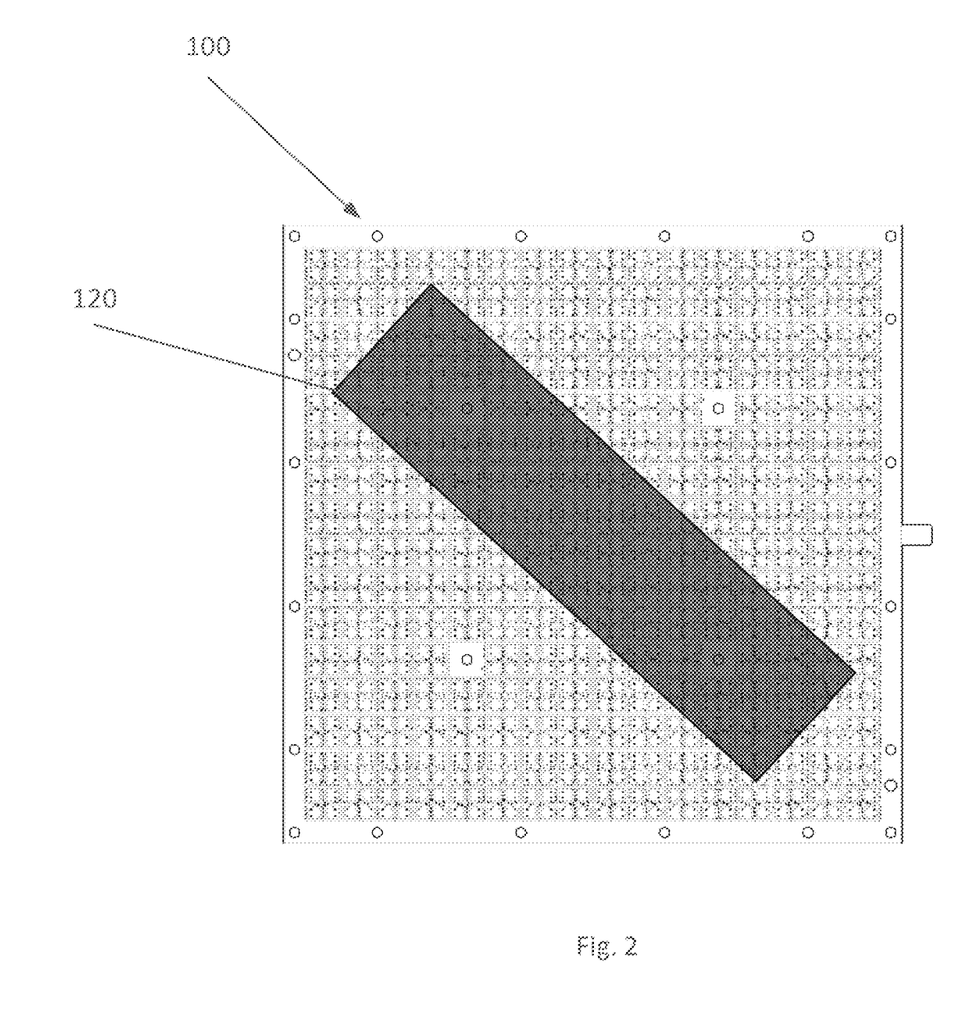
FIG. 2 shows another example of electronically reconfigurable aperture phased array antenna with active elements area, in accordance with aspects of the disclosure.

As another example, FIG. 2 shows an example of an active aperture 120 (in a rectangular form), which may be rotated (compared to the active aperture 110 shown in FIG. 1) with respect to the center of the antenna. The rotation angle may be any angle between 0-180 degrees in the antenna plane. The active aperture may be electronically rotated in clockwise and counterclockwise directions. For example, active aperture 120 shown in FIG. 2 may be generated by rotating active aperture 110 shown in FIG. 1.

Figure 3:
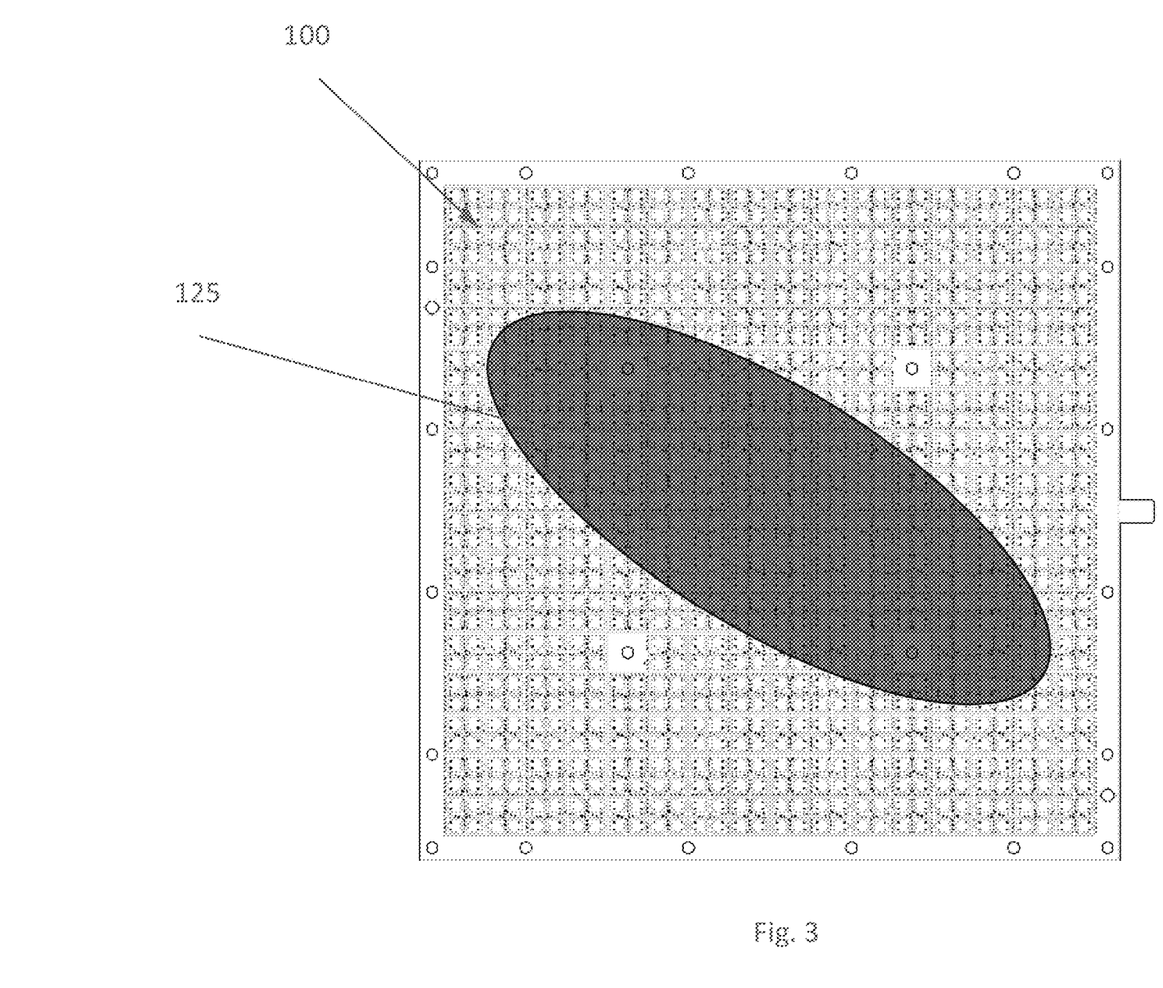
FIG. 3 shows an example of electronically reconfigurable aperture with tapered active elements area, in accordance with aspects of the disclosure.

It is to be understood that active apertures may be of any shape, such as rectangular, quadrature, circular, and/or elliptical. For example, FIG. 3 shows an active aperture 125 that is elliptical.

Figures 4A, 4B, 4C:
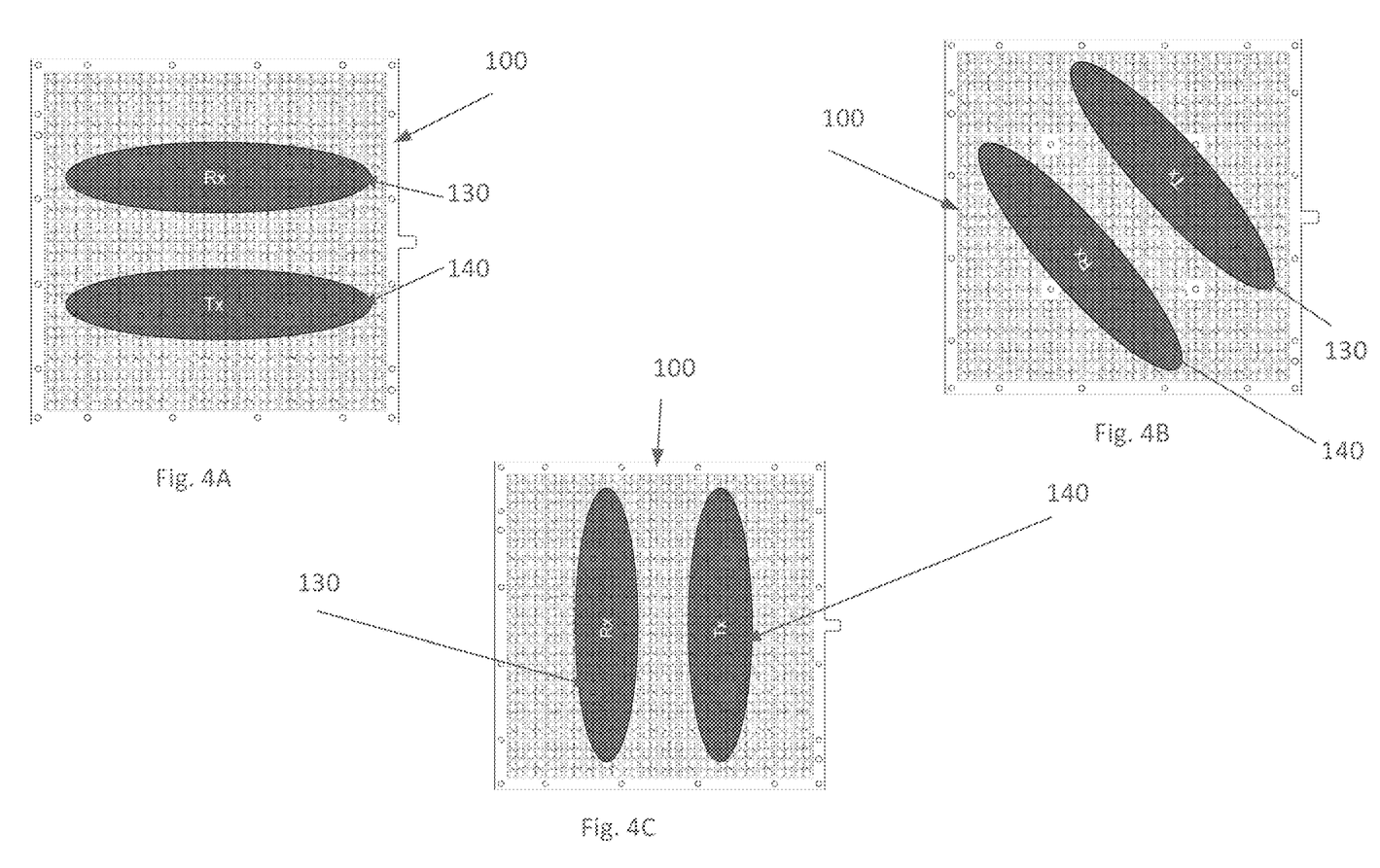
FIGS. 4A, 4B, and 4C show examples of electronically reconfigurable aperture phased array antenna with two active elements areas, in accordance with aspects of the disclosure.

In some examples, an antenna may have multiple active apertures. For example, FIGS. 4A, 4B, and 4C show two active apertures 130, 140 which may have the same and/or a different rotation angle and may be utilized both for transmit, both for receive, and/or at least one for transmit and at least one for receive. According to this example, two and more active apertures may be formed on the same antenna, as illustrated by FIGS. 4A, 4B, and 4C showing active apertures 130 and 140. The active apertures 130 and 140 may be of any form and/or size. For example, aperture 130 may be rectangular form (e.g., similar to active aperture 110 shown in FIG. 1) and aperture 140 may be tapered form (e.g., similar to active aperture 125 shown in FIG. 3). It should be understood that these are but just a few examples of the number, shapes, and sizes of the active apertures, and any number, configuration, and size of active apertures should be considered within the scope of this disclosure.

Figure 5A:
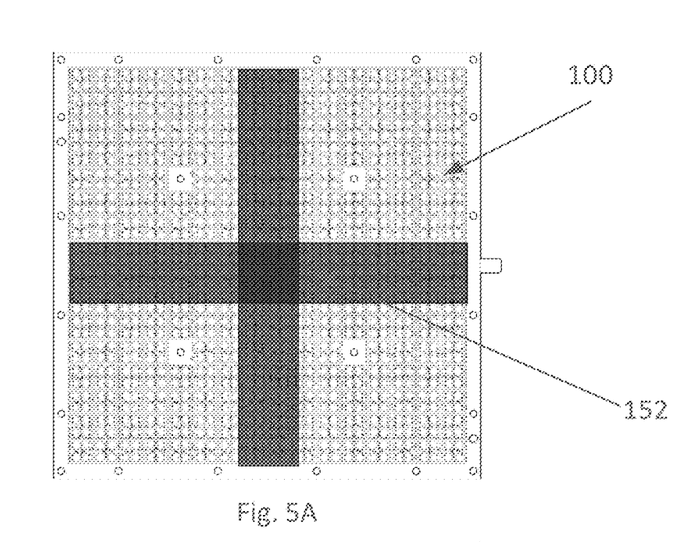
FIGS. 5A, 5B, and 5C show examples of electronically reconfigurable aperture phased array antenna with two active elements areas, in accordance with aspects of the disclosure.
Figure 5B:
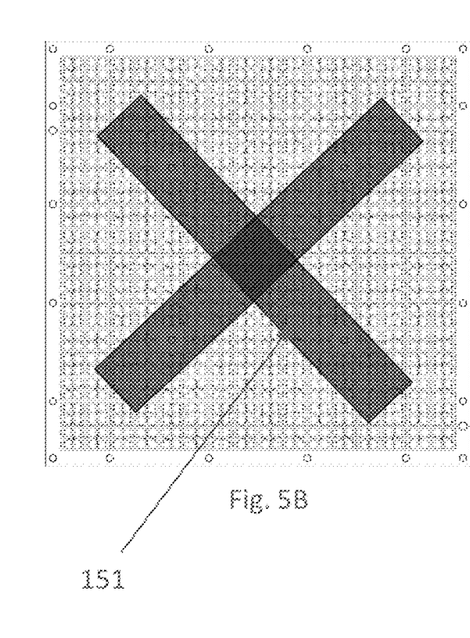
Figure 5C:
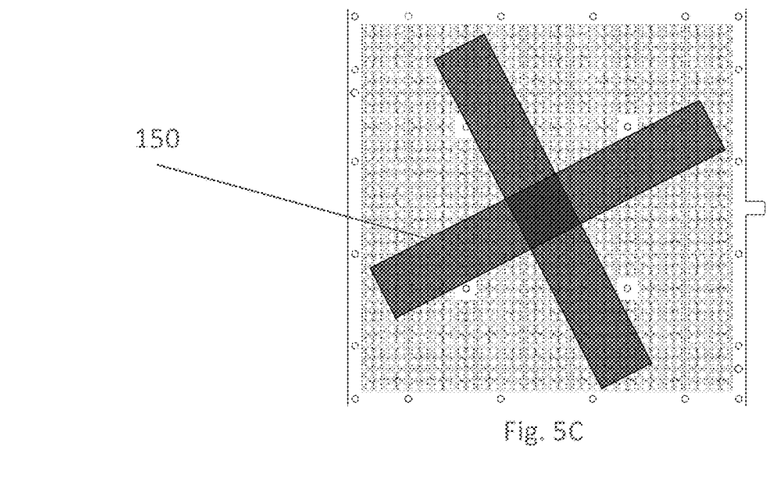

FIGS. 5A, 5B, and 5C show examples where the active aperture may be reconfigured to modify the radiation pattern and/or decrease the interference with other satellites. For example, as shown in FIGS. 5A, 5B, and 5C, an active aperture (e.g., active aperture 150, 151, 152) may be cross-shaped. In this example, the radiation pattern may have a narrow beam width in two perpendicular dimensions. In some examples, the tapered active aperture 120 may be used to decrease the level of side lobes.

In some examples, amplitude tapering of an active aperture may be used to improve ESD and ASI performance of transmit and/or receive arrays by reducing the sidelobes.

In any examples herein, active apertures (e.g., 110, 120, 130, 140, 150, 151, and 152) may be rotated to improve the skew angle and decrease interference with other satellites.

In some examples, some forms of active apertures may be used for adaptive beam shaping. For example, the beam width of radiated signal and signal sidelobes levels may be shaped to reduce interference when the antenna is in receive or transmit modes. In some examples, an active aperture may be formed to have radiation patterns that may have variable symmetry and/or variable geographic skew angles toward the GEO satellites. Active aperture may be formed to have radiation patterns with narrow beam width in one or more axis of active aperture and to have radiation patterns with wide beam in another axis.

Figure 6:
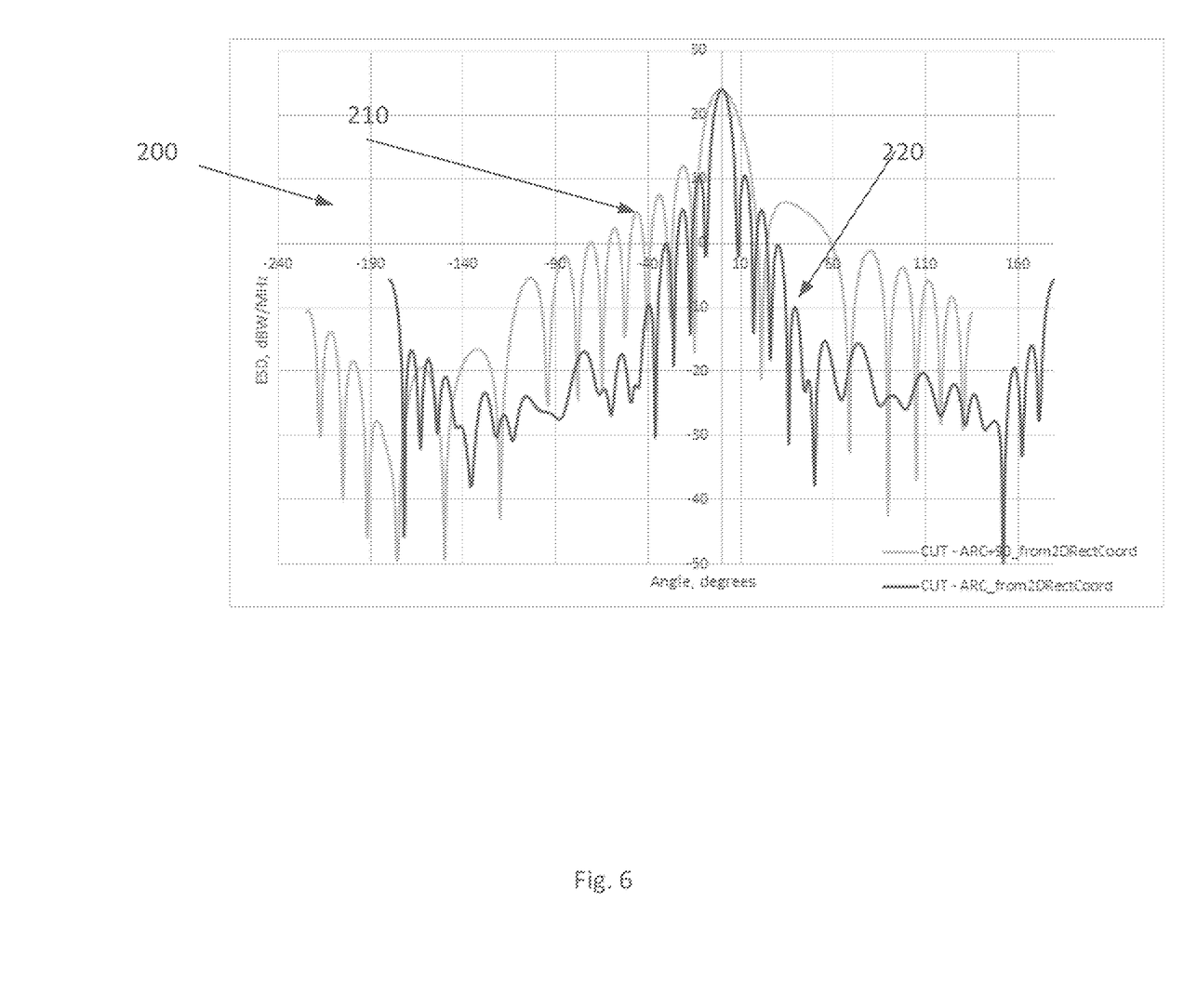
FIG. 6 shows examples of the radiation patterns of a rectangular form active aperture, in accordance with aspects of the disclosure.

FIG. 6 shows examples of radiation patterns 200 of active aperture 110 (shown in FIG. 1), where pattern 210 with wide beam width along the short axis of active aperture 110 and pattern 220 with narrow beam width along the long axis of active aperture 110.

In some examples, active aperture may be electronically configured (or reconfigured from an existing active aperture) with its narrow beam-width direction of the pattern oriented towards the geostationary orbit (GSO) arc and with the wide beam-width direction of the pattern oriented perpendicular to the GSO arc. In some cases, the antenna radiation pattern may be susceptible to violating the regulator masks at specific skew angles and may interfere with other satellites. In an example to mitigate these problems, the reconfiguration of an active antenna area (e.g., an active aperture) may be performed to cause a change of the beam width in the directions where the regulatory masks are exceeded, allowing the antenna to operate with less interference with other satellites.

Figure 7:
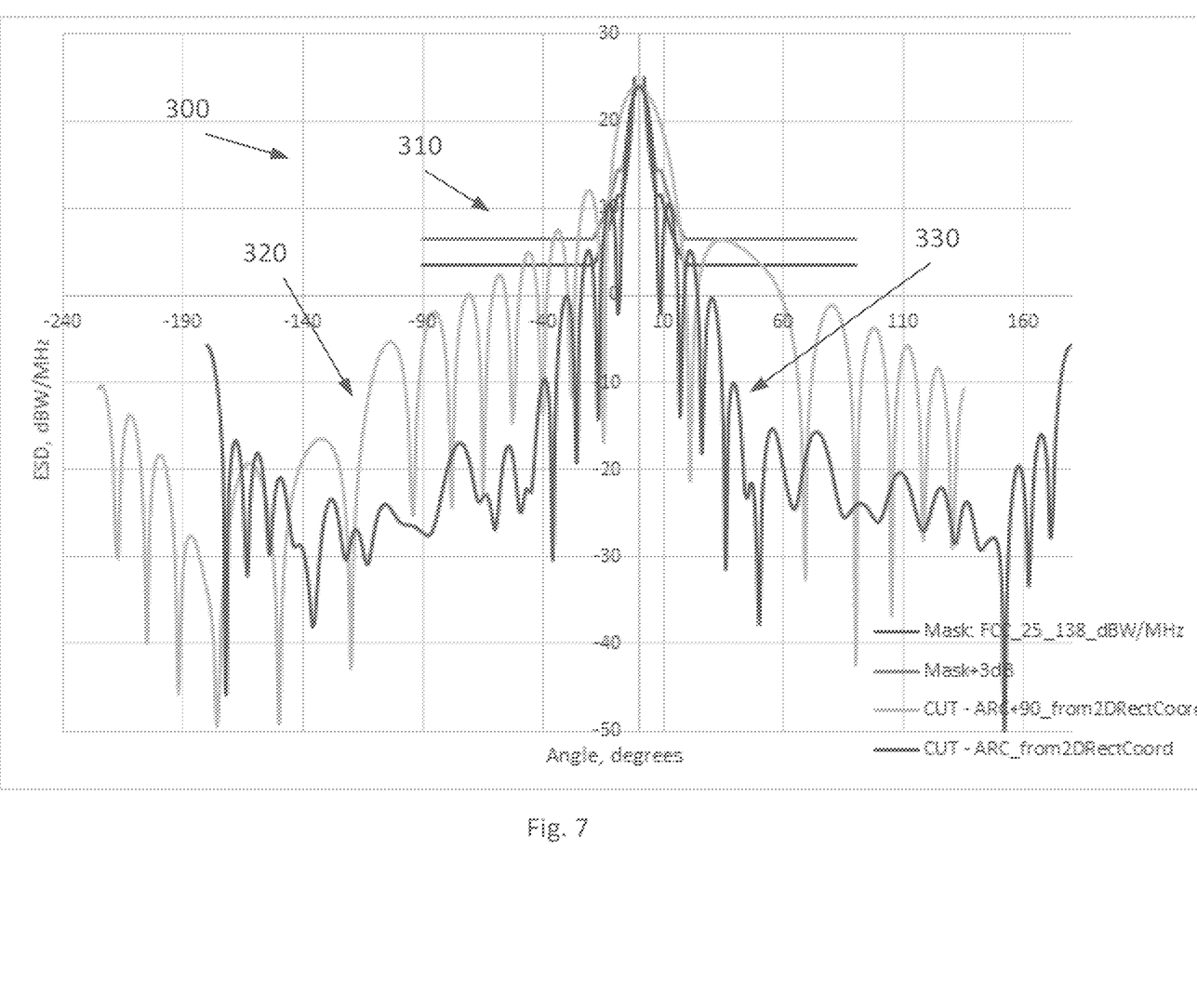
FIG. 7 shows examples of equivalent isotropically radiated power (EIRP) spectral density of an active aperture, in accordance with aspects of the disclosure.
Figure 8:
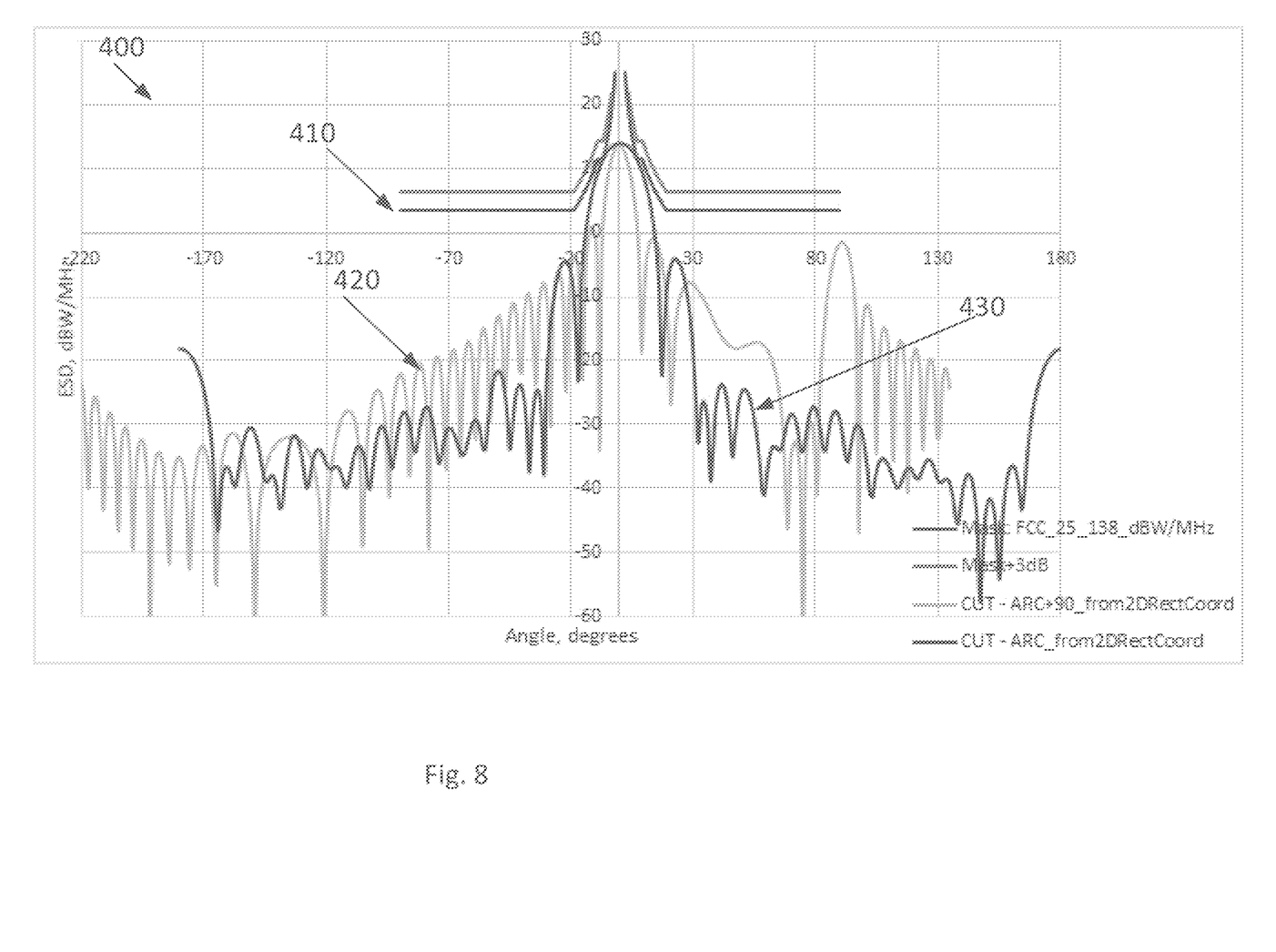
FIG. 8 shows other examples of EIRP spectral density of an active aperture, in accordance with aspects of the disclosure.

As an example, FIG. 7 shows ESD patterns for active aperture 110 (e.g., active aperture 110 shown in FIG. 1) when antenna beam is scanned to 20° of elevation and 0° of azimuth. ESD patterns 320 and 330 of active aperture 110 are shown in FIG. 7 with respect to on-axis and off-axis FCC regulatory masks 310, for a Ka-band antenna. In this case, the active aperture 110 may have been positioned with the long side tangent to GSO arc. For this orientation of the active aperture, FIG. 7 shows that ESD pattern 320 may not necessarily meet FCC mask in the plane perpendicular to GSO arc, when ESD pattern 330 may meet FCC mask in the plane parallel to GSO arc. FIG. 8 shows ESD patterns 410 and 420 of the rotated active aperture 110 (e.g., rotated active aperture 110 shown in FIG. 2), when antenna beam is scanned to the same direction of 20° of elevation and 0° of azimuth. ESD pattern 410 is tangent to GSO arc and ESD pattern 420 is perpendicular to GSO arc. As further seen in FIG. 8, both ESD patterns 410 and 420 of rotated active aperture 110 may meet the FCC masks 410.

In some examples, configurations of active apertures may be used for a remote terminal's antenna system that may communicate with several satellite communication systems (e.g., LEO, GEO or MEO satellite communication systems) concurrently. For example, active apertures 130 and 140 may be used for concurrent communications with two different satellites, for example GEO and LEO. Active apertures 130 and 140 may be formed to have radiation patterns with narrow beam width in the corresponding axis of the active aperture when the interference with adjacent satellites is probable and to have radiation patterns with wide beam in the other one.

Figure 9:
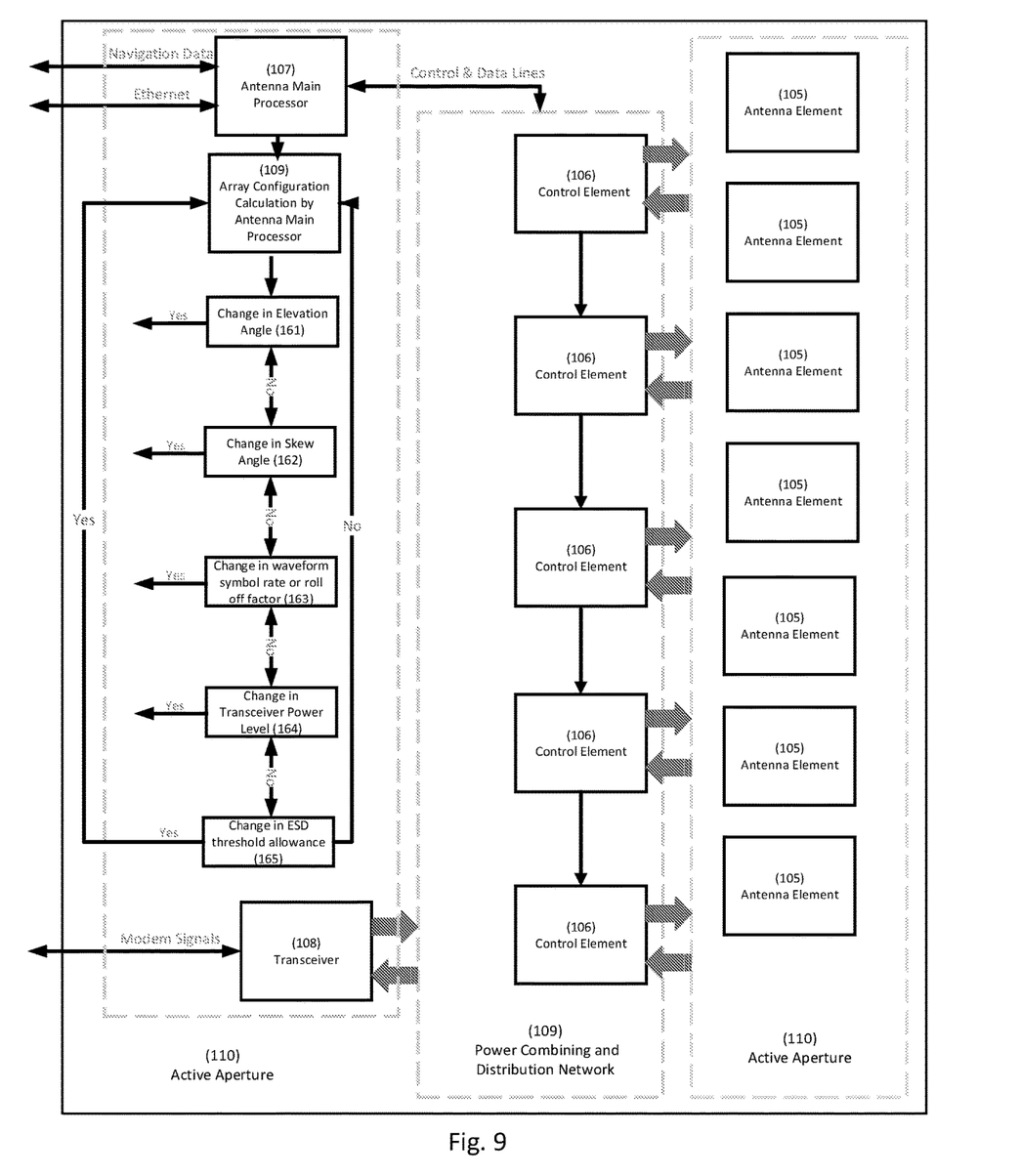
FIG. 9 shows an example of a method of controlling a phased array antenna, in accordance with aspects of the disclosure.

FIG. 9 shows an example method of controlling an antenna system with a reconfigurable active aperture.

In this example method, an antenna main processor (AMP) 107 may receive navigation and Ethernet information from a vehicle system (e.g., an aircraft system). The received information may include GPS data about the vehicle position and inertial navigation system (INS) data about the vehicle orientation (e.g., roll, pitch, and yaw of an aircraft). The received information may alsoinclude information about target communication satellites such as satellite constellation type (e.g., GEO, LEO, or MEO), satellite position, bandwidth, or satellite antenna polarization. In one example, the AMP 107 may use one or more pieces of the aforementioned information to calculate one or more attributes of active apertures. The one or more attributes of active apertures may include, e.g., forms (e.g., a rectangular shape), sizes, and orientations to provide a G/T (gain-to-noise-temperature) and EIRP performance, and to more likely comply with the FCC and/or ETSI ESD masks while keeping the power consumption of the antenna at an optimal level. The AMP 107 may send to the control elements 106 commands for activation and deactivation of the antenna elements 105 to form an active antenna aperture. The shape of the active aperture may be arranged, for example, as 110 (shown in FIG. 1), 120 (shown in FIG. 2), 125 (shown in FIG. 3), or 150-152 (shown in FIGS. 5A, 5B, and 5C). In another example, the AMP 107 may calculate phase and amplitude setting of communication signals to be provided to each active antenna element 105. The calculated the phase and amplitude setting may be used for active antenna beam shaping and beam pointing to the target satellites. The AMP 107 may use control elements 106 for activation and deactivation of the antenna elements 105 and phase and amplitude settings for the antenna array beam scanning.

In an example transmit mode, a communication modem may provide communication signals to a transceiver 108 of the antenna system. The transceiver 108 may up-convert the communication signals to satellite communication frequency bands, which for example may be Ku: 13.75-14.5 GHz or Ka: 27.5-31 GHz. The up-converted communication signals may be distributed between control elements 106 through a power combining and distribution network 111. In some examples, the power combining and distribution network 111 may include microstrip, stripline, coaxial, or waveguide transmission lines. After the control elements 106 set phases and amplitudes of the up-converted communication signals, these signals may be provided to active antenna elements 105 to be transmitted to target satellites. The communication signals received at the transceiver 108 may be, for example, baseband signals, or L-band signals in the frequency range 950-1450 MHZ.

In an example receive mode, incoming communication signals may be received by active antenna elements 105. The active antenna elements 105 may provide the incoming communication signals to control elements 106 to set the phase and amplitude of the incoming communication signals. The power combining and distribution network 111 may combine the signals from different control elements 106 and may provide the combined signal to the transceiver 108. After a down conversion of the combined signal from the satellite communication frequency bands to, e.g., base band frequencies or L-band frequencies in the range 950-2150 MHz, the transceiver 108 may provide the down converted signal to the communication modem.

In an example, a serial peripheral interface (SPI) protocol may be used for selection of the control elements 106 and for the communication between AMP 107 and control elements 106. The SPI protocol may use, for example, 4 control lines: Clock (CLK), Chip Select (CS), Data In (Din), and Data Out (Dout). The control elements 106 may be, for example, analog and/or digital integrated circuits based upon compact silicon technology. The CS and CLK lines may be used for selection of the control elements 106. The Din lines may be used to provide to control elements 106 the data packets with the position of the antenna elements that may be activated or deactivated to form the active aperture. The data packets may also include phase and amplitude settings for activated antenna elements 105, to point the active antenna beam at the direction of the target satellite and introduce amplitude tapering when appropriate.

The active aperture's 110 radiating element 105 activation or deactivation control may be dynamically set by the AMP 107 based on calculations during antenna operation. The AMP 107 processing may be based on, e.g., input parameters which may include vehicle position and orientation (as received from the vehicle's inertial navigation system and GPS receiver), transmit/receive link parameters (such as carrier symbol rate and roll off factor as per modem input), transceiver 108 power level, and/or regulation threshold parameters. The regulation threshold parameters may be preconfigured into the AMP 107 by a modem or loaded to the antenna.

Based on the vehicle position data and the satellite position data, the AMP 107 at step 109 may calculate an elevation angle and a skew angle between the active aperture 110 and the satellite. The elevation angle and the skew angle may be considered additional parameters to determine an optimal active array configuration. The AMP 107 may also dynamically monitor any change in these additional parameters to derive a new aperture configuration according to changes in factors such as vehicle position and orientation, satellite location, regulation threshold, waveform link parameters (symbol rate and roll-off factor) transceiver power level, etc. Once the new configuration is derived, the AMP 107 may send commands for the activation and deactivation of control elements 106 to set the corresponding antenna elements 105 in a suitable configuration as well as to point the beam towards the target satellite and introduce amplitude tapering (e.g., a non-uniform amplitude distribution) when appropriate. In other cases, the AMP 107 may cause a uniform amplitude distribution.

In some examples, the AMP 107 may dynamically monitor changes to various parameters. For example, at step 161, the AMP 107 may determine changes in an elevation angle between the antenna and a remote device (e.g., a satellite). At step 162, the AMP 107 may determine changes in skew angle between the antenna and the remote device. At step 163, the AMP 107 may determine a change in waveform symbol rate or roll off factor. At step 164, the AMP 107 may determine a change in transceiver power level. At step 165, the AMP 107 may determine change in ESD threshold allowance. The AMP 107 may dynamically recalculate phase and amplitudes (in step 109) if the AMP determines changes in the corresponding parameters in one or more of the steps 161, 162, 163, 164, and 165. It should be understood that these steps may be performed in any order (e.g., in parallel) and the AMP 107 may execute step 109 perform the dynamic calculation of phase and amplitude in between any of the steps 161, 162, 163, 164, and 165 and/or after all the steps have been completed.

In some examples, AMP processing and active array reconfiguration (e.g., based upon the changes detected during one or more of the steps 161, 162, 163, 164, and 165) may be done rapidly (e.g., multiple times a second) for an accurate beam pointing and for complying with regulation.

Figure 10:
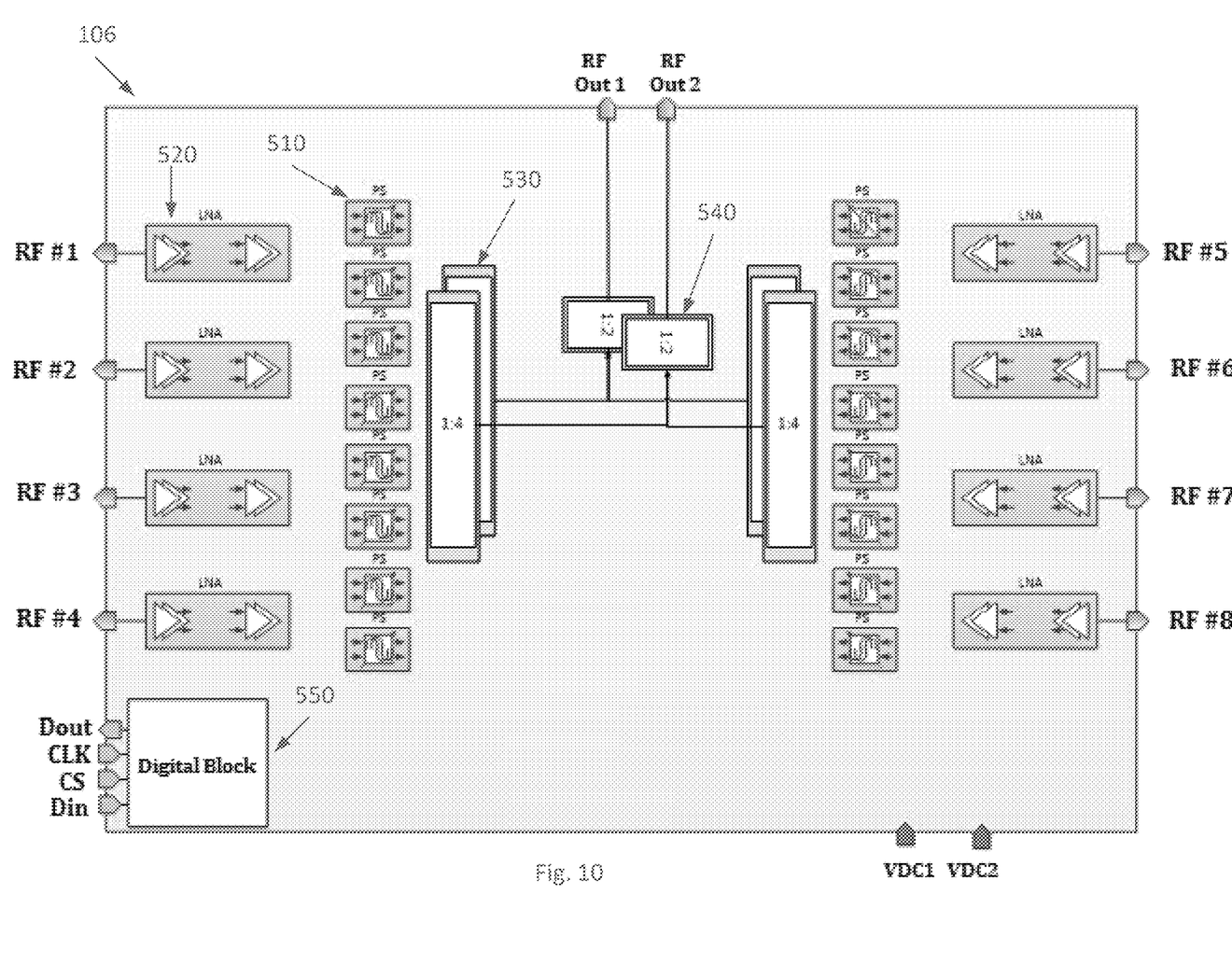
FIG. 10 shows an example of a high level block diagram of a receiver chipset, in accordance with aspects of the disclosure.
Figure 11:
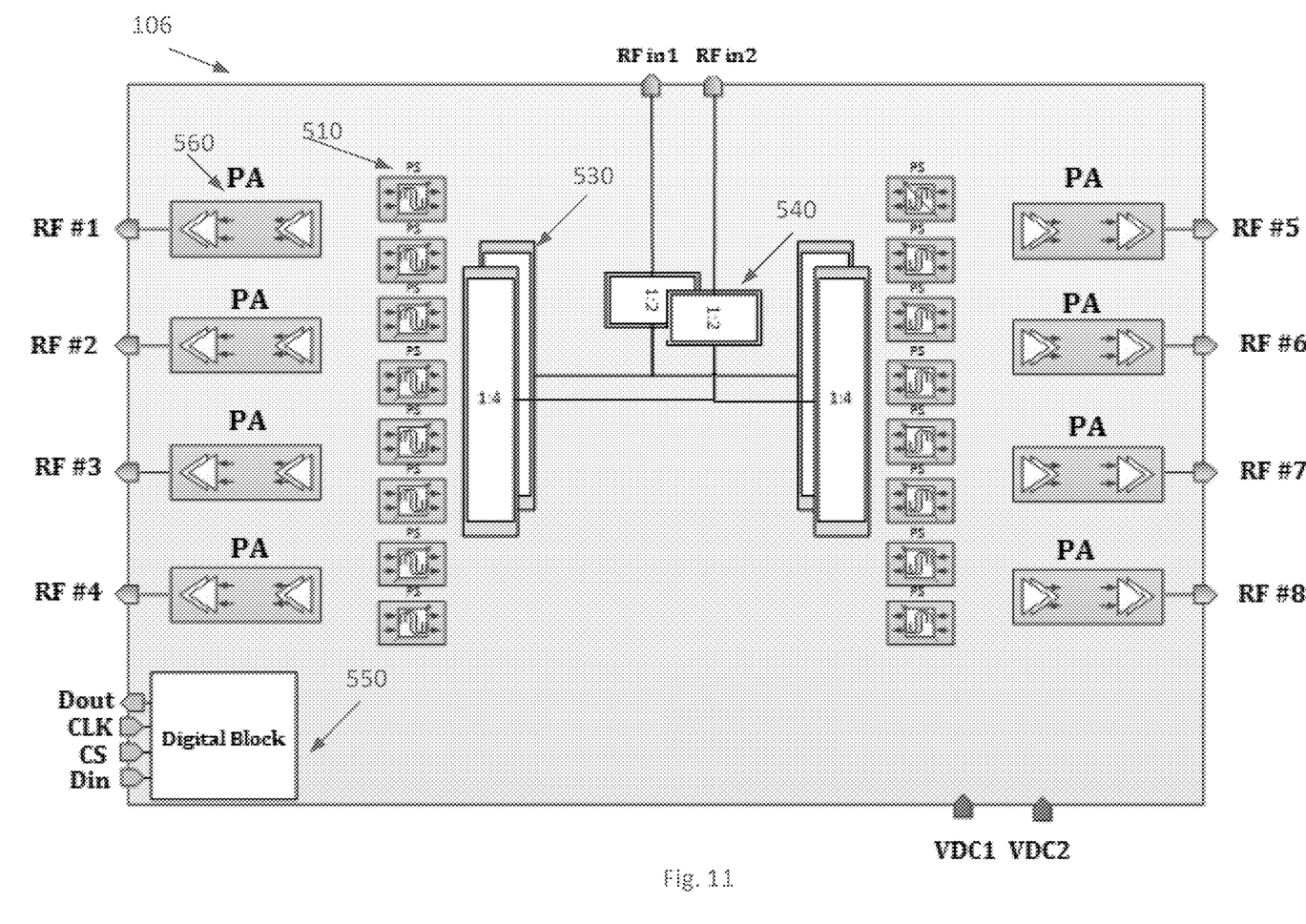
FIG. 11 shows an example of a high level block diagram of a transmission chipset, in accordance with aspects of the disclosure.

FIG. 10 and FIG. 11 show examples of internal components of an exemplary control element 106. More particularly, FIG. 10 shows a high level block diagram of internal components (e.g., receiving chipset) of a control element 106 for activating/deactivating antenna elements and for setting the phase and amplitude of antenna elements in a receiving mode of operation. The high level block diagram shown on FIG. 10 may comprise RF circuitry, analog circuitry, and digital circuitry. As described herein, the high level block diagram may include 8 signal channels (e.g., RF #1 through RF #8). Each channel may comprise an amplifier such as a low-noise amplifier (LNA) 520 and one or more variable phase shifters and variable digital/analog attenuators 510. For example, FIG. 10 shows two variable phase shifters and variable digital/analog attenuators 510 for a single channel. It should be understood that the combined variable phase shifter and variable digital/analog attenuators is shown merely as an example and should not be considered limiting. For example, a variable phase shifter may be a separate component from a variable digital/analog attenuator.

For dual beam operation the signals after the LNAs 520 are divided and are processed separately for each of the beams. After beam forming and polarization processing in phase shifters and attenuators, the signals for each of the two beams are combined separately through combiners 530 and 540 and provided to the two separate outputs (e.g., RF out 1 and RF out 2) of the control element 106. It should however be understood that the shown configuration with two separate outputs is merely an example and the control element 106 may provide one or multiple outputs.

In some examples, I&Q vector modulator may be used for implementation of the variable phase shifters and attenuators 510. A digital block 550 may control the activation and deactivation of the specified antenna elements and further control the phase and amplitude settings based on the data received from AMP 107. The interface of the digital block 550 as shown herein may be a standard SPI protocol, where CS and CLK may indicate whether the control element 106 (and consequently the corresponding antenna elements 105) is selected. The control element 106 may activate or deactivate the corresponding antenna elements by manipulating power supply or attenuation of the specified channels.

FIG. 11 shows an example of high level block diagram of internal components (e.g., transmission chipset) of a control element 106 for transmitting mode of operation. These components may control the activation/deactivation and phase and amplitude settings of corresponding antenna elements 105. As shown, the control element 106 may comprise 8 signal channels (e.g., RF #1 through RF #8). Each signal channel may include a power amplifier (PA) 560 and variable phase shifters and variable attenuators 510. The example shown in FIG. 10 includes two separate variable phase shifters and variable attenuators 510 for each channel, which should not be considered limiting. Any number of variable phase shifters and variable digital/analog attenuators 510 may be used for any number of channels. In some examples, the phase shifting and attenuating functionality may be provided by separate components.

In an example dual beam operation, two different signals (e.g., via RF in1 and RF in2) may enter the control element 106. The phase shifters and attenuators 510 may perform beam forming and polarization processing and the signals may be combined before providing the signals to PAS 560. After the amplification at the PAs 560, the signals are provided to corresponding active antenna elements 105 for transmission. The communication signals of the two beams can be transmitted at the same frequency or at different frequency bands. The signals from all active antenna elements may be radiated as one or two beams, pointing to one or two different satellites, or to two different spot beam of the same satellite. For the transmit mode of operation, the antenna elements may be activated and deactivated by manipulating power supply or attenuation of the specified channels.

What is claimed is:

1. An antenna system comprising:
   a transceiver configured to, via a plurality of antenna elements of an antenna, receive incoming signals or transmit outgoing signals;
   one or more processors configured to:
   receive, from a vehicle system, information comprising at least vehicle position data, vehicle orientation data, satellite position data, satellite bandwidth data, and satellite antenna polarization data;
determine, based on the information, one or more attributes of active apertures comprising at least shapes, sizes, and orientations;
based on the determined one or more attributes and threshold parameters preconfigured into the one or more processors, electronically activate a subset of the plurality of antenna elements to form an active aperture of the antenna; and
a plurality of control circuits configured to operate in a transmit mode to transmit outgoing signals via the active aperture of the antenna or a receiver mode to receive incoming signals via the active aperture of the antenna.

2. The antenna system of claim 1, wherein the one or more processors are further configured to electronically deactivate the subset of the plurality of antenna elements and electronically activate another subset of the plurality of antenna elements to form another active aperture of the antenna.

3. The antenna system of claim 2, wherein the activation of the other subset of the plurality of antenna elements causes the antenna to change corresponding beam widths in one or more directions.

4. The antenna system of claim 1, wherein the one or more processors are further configured to electronically activate a second subset of the plurality of antenna elements to form a second active aperture of the antenna.

5. The antenna system of claim 1, wherein the active aperture is rectangular, elliptical, or cross-shaped.

6. The antenna system of claim 1, wherein the active aperture is tapered.

7. The antenna system of claim 1, wherein the one or more processors are further configured to cause the active aperture to generate a uniform amplitude distribution.

8. The antenna system of claim 1, wherein the one or more processors are further configured to cause the active aperture to generate a tapered amplitude distribution.

9. The antenna system of claim 1, wherein the one or more processors are further configured to, based on the determined one or more attributes, electronically deactivate the subset of the plurality of antenna elements and electronically activate a second subset of the plurality of antenna elements to form a rotated active aperture.

10. The antenna system of claim 1, wherein the one or more processors are further configured to, based on the determined one or more attributes, electronically activate a second subset of the plurality of antenna elements to form a second active aperture of the antenna.

11. The antenna system of claim 10, wherein the one or more processors are further configured to, based on detecting a change in at least one of a vehicle position, a vehicle orientation, a satellite location, a symbol rate, a roll-off factor, and a power level, electronically activate the second subset of the plurality of antenna elements.

12. A method comprising:
receiving, by one or more processors and from a vehicle system, information comprising at least vehicle position data, vehicle orientation data, satellite position data, satellite bandwidth data, and satellite antenna polarization data;
determining, based on the information, one or more attributes of active apertures comprising at least shapes, sizes, and orientations;
electronically activating, based on the determined one or more attributes and threshold parameters preconfigured into the one or more processors, a subset of a plurality of antenna elements to form an active aperture of an antenna; and
causing one or more of a plurality of control circuits to operate in a transmit mode to transmit outgoing signals via the active aperture of the antenna or a receiver mode to receive incoming signals via the active aperture of the antenna.

13. The method of claim 12, further comprising:
detecting a change in at least one of a vehicle position, a vehicle orientation, a satellite location, a symbol rate, a roll-off factor, and a power level; and
based on the detecting, electronically deactivating the subset of the plurality of antenna elements and electronically activating another subset of the plurality of antenna elements to form another active aperture of the antenna.

14. The method of claim 12, further comprising:
detecting a change in at least one of a vehicle position, a vehicle orientation, a satellite location, a symbol rate, a roll-off factor, and a power level; and
based on the detecting, electronically activating a second subset of the plurality of antenna elements to form a second active aperture of the antenna.

15. The method of claim 13, wherein the other active aperture forms a rotated active aperture.

16. The method of claim 12, further comprising:
causing the active aperture to generate a uniform amplitude distribution.

17. The method of claim 12, further comprising:
causing the active aperture to generate a tapered amplitude distribution.

18. The method of claim 12, wherein the active aperture is tapered.

19. The antenna system of claim 1, wherein, in the transmit mode, each control circuit of the plurality of control circuits is configured to:
receive at least one up-converted outgoing signal from the transceiver;
perform beam forming and polarization processing on the at least one up-converted outgoing signal to produce multiple processed outgoing signals; and
provide the multiple processed outgoing signals to an activated subset of the plurality of antenna elements for transmission; and
wherein, in the receive mode, each control circuit of the plurality of control circuits is configured to:
receive incoming signals from an activated subset of the plurality of antenna elements;
perform beam forming and polarization processing on the received incoming signals to produce a combined incoming signal; and
provide the combined incoming signal to the transceiver.

20. The method of claim 12, wherein the causing the one or more of the plurality of control circuits comprises:
causing the one or more of the plurality of control circuits to operate in the transmit mode to:
receive, from a transceiver, at least one up-converted outgoing signal;
perform beam forming and polarization processing on the at least one up-converted outgoing signal to produce multiple processed outgoing signals; and
send, to an activated subset of the plurality of antenna elements, the multiple processed outgoing signals for transmission; and causing the one or more of the plurality of control circuits to operate in the receive mode to:
- receive, from an activated subset of the plurality of antenna elements, incoming signals;
- perform beam forming and polarization processing on the received incoming signals to produce a combined incoming signal; and
- send, to the transceiver, the combined incoming signal.

21. The antenna system of claim 1, wherein the vehicle system comprises an aircraft.

22. The method of claim 12, wherein the vehicle system comprises an aircraft.

* * * * *